(12) United States Patent
Kim et al.

(10) Patent No.: US 11,880,269 B2
(45) Date of Patent: Jan. 23, 2024

(54) METHOD FOR GENERATING GAUSSIAN ERROR DATA USING FLASH MEMORY AND APPARATUS USING THE SAME

(71) Applicant: ELECTRONICS AND TELECOMMUNICATIONS RESEARCH INSTITUTE, Daejeon (KR)

(72) Inventors: Moon-Seok Kim, Daejeon (KR); Bong-Soo Lee, Daejeon (KR); Jun-Ki Kang, Daejeon (KR); Ki-Hong Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 321 days.

(21) Appl. No.: 17/458,138

(22) Filed: Aug. 26, 2021

(65) Prior Publication Data

US 2022/0374302 A1   Nov. 24, 2022

(30) Foreign Application Priority Data

May 20, 2021   (KR) .................. 10-2021-0064648

(51) Int. Cl.
*G06F 11/07*   (2006.01)
*G06F 3/06*   (2006.01)
(Continued)

(52) U.S. Cl.
CPC ........ *G06F 11/0778* (2013.01); *G06F 3/0619* (2013.01); *G06F 3/0659* (2013.01);
(Continued)

(58) Field of Classification Search
CPC .. G06F 11/0778; G06F 3/0619; G06F 3/0659; G06F 3/0679; H04L 9/3093; H01L 29/792
See application file for complete search history.

(56) References Cited

U.S. PATENT DOCUMENTS

| 9,552,887 B2 | 1/2017 | Kim et al. |
| 10,630,655 B2 | 4/2020 | Becker et al. |

(Continued)

FOREIGN PATENT DOCUMENTS

| KR | 10-2014-0052691 A | 5/2014 |
| KR | 10-2016-0002027 A | 1/2016 |

(Continued)

OTHER PUBLICATIONS

Yao Liu et al., "High-Speed Discrete Gaussian Sampler With Heterodyne Chaotic Laser Inputs," 2018 IEEE Transactions on Circuits and Systems II: Express Briefs.

(Continued)

*Primary Examiner* — Beemnet W Dada
(74) *Attorney, Agent, or Firm* — LRK PATENT LAW FIRM (57) ABSTRACT

Disclosed herein are a method for generating Gaussian error data using flash memory and an apparatus using the method. The method includes receiving a request to generate Gaussian error data and delivering an operation command to flash memory; generating Gaussian error noise based on a threshold voltage that is generated when the flash memory performs the operation command; and generating Gaussian error data so as to correspond to the Gaussian error noise and providing the same.

16 Claims, 5 Drawing Sheets

(51) Int. Cl.
    *H04L 9/30*     (2006.01)
    *G11C 16/04*     (2006.01)
    *H01L 29/792*     (2006.01)

(52) U.S. Cl.
    CPC ........ *G06F 3/0679* (2013.01); *G06F 11/0727* (2013.01); *G06F 11/0754* (2013.01); *H04L 9/3093* (2013.01); *G11C 16/0483* (2013.01); *H01L 29/792* (2013.01)

(56) References Cited

U.S. PATENT DOCUMENTS

| | | | |
|---|---|---|---|
| 11,004,519 | B2 | 5/2021 | Lee et al. |
| 11,055,229 | B2 | 7/2021 | Oh |
| 11,126,403 | B2* | 9/2021 | Yang .................... H04L 9/0662 |
| 2017/0178710 | A1* | 6/2017 | Augustine .......... G11C 13/0059 |
| 2017/0242660 | A1* | 8/2017 | Katoh .................... H04L 9/0662 |
| 2018/0151224 | A1* | 5/2018 | Chih .................... G11C 13/0059 |
| 2019/0116035 | A1 | 4/2019 | Mustafa et al. |

FOREIGN PATENT DOCUMENTS

| | | |
|---|---|---|
| KR | 10-2020-0060104 A | 5/2020 |
| KR | 10-2021-0024912 A | 3/2021 |

OTHER PUBLICATIONS

Ayesha Khalid et al., "Compact, Scalable, and Efficient Discrete Gaussian Samplers for Lattice-Based Cryptography," 2018 IEEE International Symposium on Circuits and Systems (ISCAS).

Raymond K. Zhao et al., "FACCT: FAst, Compact, and Constant-Time Discrete Gaussian Sampler over Integers," 2020 IEEE Transactions on Computers.

* cited by examiner

METHOD FOR GENERATING GAUSSIAN ERROR DATA USING FLASH MEMORY AND APPARATUS USING THE SAME

CROSS REFERENCE TO RELATED APPLICATION

This application claims the benefit of Korean Patent Application No. 10-2021-0064648, filed May 20, 2021, which is hereby incorporated by reference in its entirety into this application.

BACKGROUND OF THE INVENTION

1. Technical Field

The present invention relates generally to technology for generating Gaussian error data, and more particularly to technology for generating an intentional error, which is an essential element for implementing lattice-based cryptography, using a threshold voltage deviation of flash memory.

2. Description of Related Art

Flash memory is a kind of memory device that includes a charge-trapping layer in a transistor and uses a physical characteristic in which the threshold voltage of the transistor varies depending on whether a charge is present in the charge-trapping layer. NAND flash memory, which is one type of such flash memory, is the kind of memory device that is currently most widely used, and has advantages in that it has the highest degree of integration, among all semiconductor devices, and in that it has a high memory read speed.

Meanwhile, with the development of quantum technology, implementation of quantum computer technology is receiving a lot of attention in the research field. Particularly, Shor's Algorithm, which can be implemented only in quantum computing, makes the speed of prime factorization faster than about ten million times the speed of prime factorization using existing computing methods. This means that cryptography used before quantum computing technology, such as Rivest-Shamir-Adleman (RSA), cannot perform the cryptography function in quantum computing.

In order to solve this problem, cryptography academics are establishing standards for Post-Quantum Cryptography (PQC) technology on the initiative of the National Institute of Standards and Technology (NIST) of the U.S. One of the prime technologies expected to be established as a standard, among PQC technologies, is lattice-based cryptography technology. Lattice-based cryptography is an asymmetric cryptography method in which a message is encrypted by applying a public key and intentional error information thereto, and the message cannot be decrypted unless an attacker has a private key and the intentional error information.

Here, the intentional error information is error information having a Gaussian distribution, and an apparatus for outputting a Gaussian-distributed error is referred to as a Gaussian extractor or a Gaussian sampler. The functions of a Gaussian extractor may be implemented by combining a true random number generator and a Field-Programmable Gate Array (FPGA) or a software circuit.

However, the true random number generator entails a lot of overhead from the aspects of implementation size and speed, and implementation of the FPGA and the software circuit also entails a lot of overhead from the aspect of size.

DOCUMENTS OF RELATED ART (Patent Document 1) U.S. Patent Application Publication US2019/0116035, published on Apr. 18, 2019 and titled "Post-Quantum Cryptographic Communication Protocol".

SUMMARY OF THE INVENTION

An object of the present invention is to implement a Gaussian extractor in which both a high degree of integration and fast read/write characteristics are realized using the physical characteristics of a semiconductor unit device, without using a true random number generator, an FPGA circuit, or a software circuit.

Another object of the present invention is to implement a Gaussian sampler that has excellent performance although it incurs low production cost by using flash memory, which is one of the most widely used commercial semiconductor products worldwide.

A further object of the present invention is to implement a Gaussian sampler using a commercially widely used semiconductor device, thereby reducing overhead from the aspects of implementation size and speed compared to when a true random number generator is used or when an FPGA and a software circuit are used.

In order to accomplish the above objects, a method for generating Gaussian error data according to the present invention includes receiving a request to generate Gaussian error data and delivering an operation command to flash memory; generating Gaussian error noise based on a threshold voltage that is generated when the flash memory performs the operation command; and generating Gaussian error data so as to correspond to the Gaussian error noise and providing the Gaussian error data.

Here, the Gaussian error noise may be generated so as to correspond to a Gaussian-distributed resistance measured based on the threshold voltage.

Here, the threshold voltage may be a voltage that is generated when a flash memory unit device performs a read command.

Here, the Gaussian-distributed resistance may be measured based on the threshold voltage that is generated while the flash memory repeatedly performs reading, writing, and erasing in compliance with the operation command.

Here, the Gaussian error data may be intentional error information for implementing lattice-based cryptography, which is Post-Quantum Cryptography (PQC) technology.

Here, the flash memory may include a gate formed of a tunneling oxide, a charge-trapping layer, and a tunneling-blocking oxide.

Here, the Gaussian-distributed resistance may be measured so as to correspond to physical characteristics of a tunneling phenomenon caused by the threshold voltage in the gate.

Here, the threshold voltage may be raised as an electron density of the charge-trapping layer is higher.

Also, an apparatus for generating Gaussian error data according to an embodiment of the present invention includes a processor for receiving a request to generate Gaussian error data, delivering an operation command to flash memory, generating Gaussian error noise based on a threshold voltage that is generated when the flash memory performs the operation command, generating Gaussian error data so as to correspond to the Gaussian error noise, and providing the Gaussian error data; and memory for storing the Gaussian error data.

Here, the Gaussian error noise may be generated so as to correspond to a Gaussian-distributed resistance measured based on the threshold voltage.

Here, the threshold voltage may be a voltage that is generated when a flash memory unit device performs a read command.

Here, the Gaussian-distributed resistance may be measured based on the threshold voltage that is generated while the flash memory repeatedly performs reading, writing, and erasing in compliance with the operation command.

Here, the Gaussian error data may be intentional error information for implementing lattice-based cryptography, which is Post-Quantum Cryptography (PQC) technology.

Here, the flash memory may include a gate formed of a tunneling oxide, a charge-trapping layer, and a tunneling-blocking oxide.

Here, the Gaussian-distributed resistance may be measured so as to correspond to physical characteristics of a tunneling phenomenon caused by the threshold voltage in the gate.

Here, the threshold voltage may be raised as an electron density of the charge-trapping layer is higher.

BRIEF DESCRIPTION OF THE DRAWINGS

The above and other objects, features, and advantages of the present invention will be more clearly understood from the following detailed description taken in conjunction with the accompanying drawings, in which.

DESCRIPTION OF THE PREFERRED EMBODIMENTS

The present invention will be described in detail below with reference to the accompanying drawings. Repeated descriptions and descriptions of known functions and configurations which have been deemed to unnecessarily obscure the gist of the present invention will be omitted below. The embodiments of the present invention are intended to fully describe the present invention to a person having ordinary knowledge in the art to which the present invention pertains. Accordingly, the shapes, sizes, etc. of components in the drawings may be exaggerated in order to make the description clearer.

Hereinafter, a preferred embodiment of the present invention will be described in detail with reference to the accompanying drawings.

Figure 1:
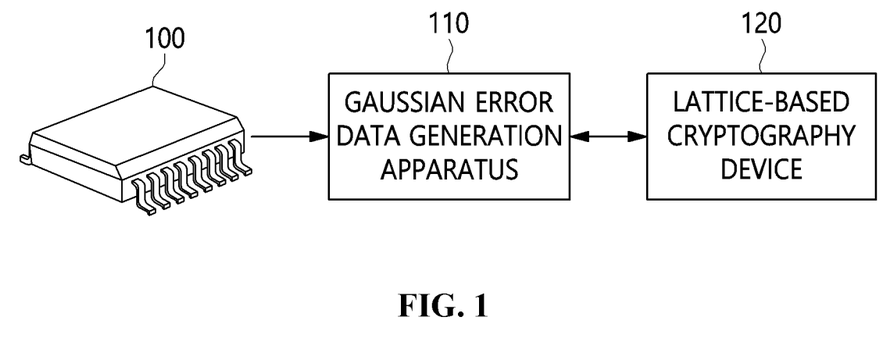
FIG. 1 is a view illustrating a system for generating Gaussian error data according to an embodiment of the present invention.

FIG. 1 is a view illustrating a system for generating Gaussian error data according to an embodiment of the present invention.

Referring to FIG. 1, the system for generating Gaussian error data according to an embodiment of the present invention includes flash memory 100, a Gaussian error data generation apparatus 110, and a lattice-based cryptography device 120.

The flash memory 100 is a semiconductor memory device that uses a characteristic whereby the threshold voltage value of a transistor varies depending on whether or not the charge-trapping layer of the transistor stores a charge. NAND flash memory has an advantage in that it has the highest degree of integration, among all semiconductor devices. However, it has a disadvantage in which it cannot avoid threshold voltage distribution at the time of memory operations such as program and erase operations.

The present invention takes advantage of threshold voltage distribution, which is regarded as a disadvantage of a memory device, thereby proposing a method capable of providing Gaussian error data, which is required for implementation of lattice-based cryptography, using flash memory while maintaining the above-mentioned advantages of flash memory.

The Gaussian error data generation apparatus 110 receives a request from the lattice-based cryptography device 120 to generate error data, and delivers an operation command to the flash memory 100.

Here, the flash memory 100 may include a gate formed of a tunneling insulator (tunneling oxide), a charge-trapping layer, and a tunneling-blocking insulator (tunneling-blocking oxide).

Also, the Gaussian error data generation apparatus 110 generates Gaussian error noise based on a threshold voltage, which is generated when the flash memory 100 performs the operation command.

Here, the threshold voltage may be a voltage that is generated when a read command is performed in the unit device of the flash memory 100.

Here, the higher the electron density of the charge-trapping layer of the flash memory 100, the higher the threshold voltage.

Here, the Gaussian error noise may be generated so as to correspond to Gaussian-distributed resistance measured based on the threshold voltage.

Here, the Gaussian-distributed resistance may be measured based on the threshold voltage that is generated while the flash memory 100 repeatedly performs reading, writing, and erasing in compliance with the operation command.

Here, the Gaussian-distributed resistance may be measured so as to correspond to the physical characteristics of a tunneling phenomenon caused by the threshold voltage in the gate of the flash memory 100.

Also, the Gaussian error data generation apparatus 110 generates Gaussian error data so as to correspond to the Gaussian error noise, and provides the same.

Here, the Gaussian error data may be intentional error information for implementing lattice-based cryptography, which is Post-Quantum Cryptography (PQC) technology.

The lattice-based cryptography device 120 may be a device for implementing lattice-based cryptography.

Here, the lattice-based cryptography is one type of Post-Quantum Cryptography (PQC) that can withstand quantum computer capabilities. The lattice-based cryptography uses Learning With Errors (LWE), and is technology for intentionally applying an error signal, thereby preventing deciphering despite quantum computer calculations.

In order to intentionally apply an error signal, as described above, Gaussian sampler hardware for generating an error signal with a Gaussian distribution is required.

In a conventional method, a combination of a true random number generator and an FPGA or a software circuit is used in order to implement a Gaussian sampler, but the true random number generator entails a lot of overhead from the aspects of implementation size and speed, and implementation of the FPGA and the software circuit also entails a lot of overhead from the aspect of size.

According to the present invention, using a general function of the flash memory 100, which has a threshold voltage deviation according to a Gaussian distribution whenever memory program/erase operations are performed, a Gaussian-distributed error signal is generated and provided, whereby a Gaussian sampler may be implemented more easily.

Figure 2:
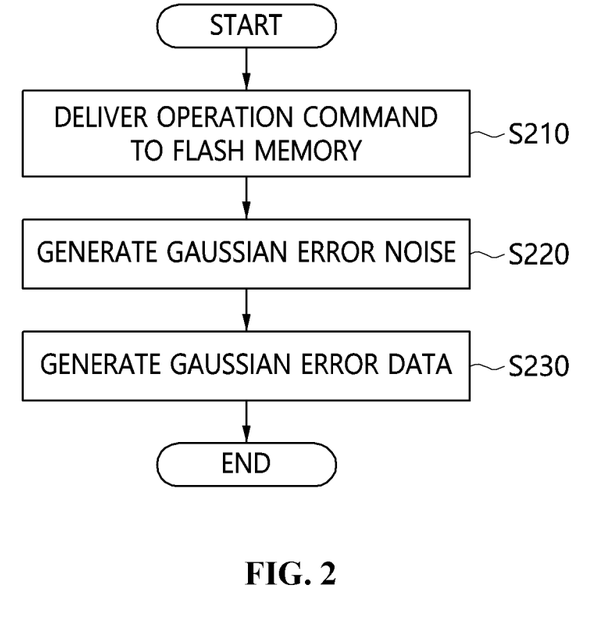
FIG. 2 is a flowchart illustrating a method for generating Gaussian error data according to an embodiment of the present invention.

FIG. 2 is a flowchart illustrating a method for generating Gaussian error data according to an embodiment of the present invention.

Referring to FIG. 2, in the method for generating Gaussian error data according to an embodiment of the present invention, a request to generate Gaussian error data is received, and an operation command is delivered to flash memory at step S210.

For example, in order to implement lattice-based cryptography, which is Post-Quantum Cryptography (PQC) technology, a request to generate Gaussian error data may be made.

Here, the flash memory may include a gate formed of a tunneling insulator (a tunneling oxide), a charge-trapping layer, and a tunneling-blocking insulator (a tunneling-blocking oxide).

Figure 3:
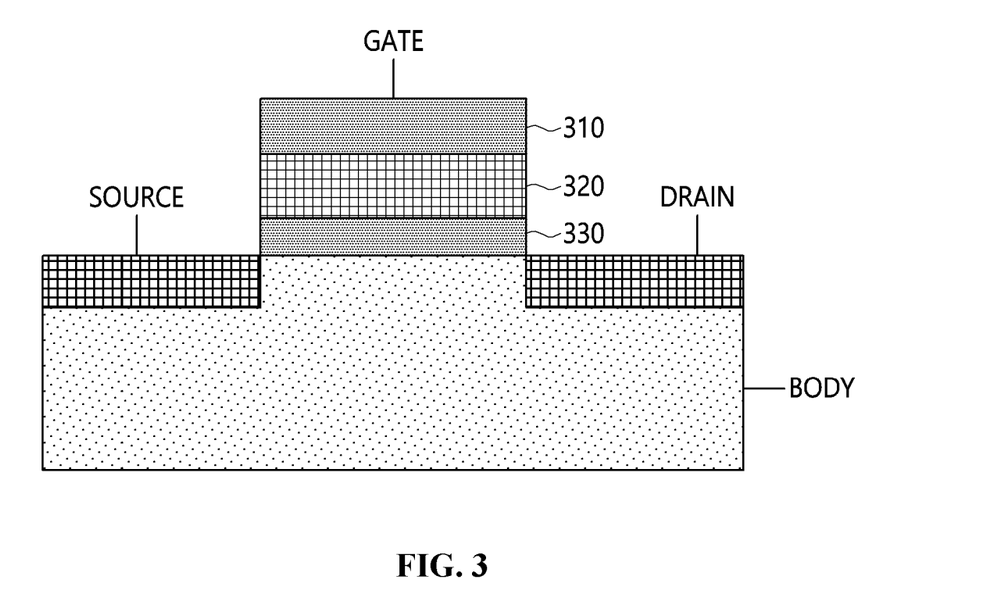
FIG. 3 is a cross-sectional view illustrating an example of a flash memory unit device according to the present invention.

For example, referring to FIG. 3, a semiconductor transistor device corresponding to the flash memory may have three terminals, namely a gate, a source, and a drain. Here, a gate insulator may be present between the gate and a silicon body.

In the case of a general transistor, a gate insulator is present as a single layer, but flash memory may have a charge-trapping layer 320 between a gate and a body.

That is, referring to FIG. 3, a tunneling oxide 330 may be deposited or generated on the silicon body in the process of manufacturing flash memory. Then, a charge-trapping layer 320 may be deposited on the tunneling oxide 330. Then, a tunneling-blocking oxide 310 may be deposited on the charge-trapping layer 320.

Here, the tunneling oxide 330 may be an insulator for moving electrons between the silicon body and the charge-trapping layer 320. For example, when a voltage equal to or higher than a certain voltage is applied to the gate, a tunneling phenomenon occurs, whereby electrons may move by penetrating through the thin tunneling oxide 330.

Here, the tunneling phenomenon indicates a phenomenon in which electrons are moved by a strong electric field.

Here, the charge-trapping layer 320 may be generated using a material capable of storing electrons well, without loss of electrons.

Here, the tunneling-blocking oxide 310 may be an insulator for preventing the electrons from spilling out of the charge-trapping layer 320 to the gate.

Also, in the method for generating Gaussian error data according to an embodiment of the present invention, Gaussian error noise is generated at step S220 based on a threshold voltage that is generated when the flash memory performs the operation command.

Here, the threshold voltage may be a voltage that is generated when a read command is performed in the flash memory unit device.

For example, when a reading procedure is performed in the flash memory unit device, a voltage that causes the magnitude of output current to rapidly increase may be detected, and this voltage may be the threshold voltage.

Here, the higher the electron density of the charge-trapping layer, the higher the threshold voltage.

That is, the higher the electron density of the charge-trapping layer, the higher the threshold voltage of the transistor. Conversely, the lower the electron density of the charge-trapping layer, the lower the threshold voltage of the transistor.

Figure 4:
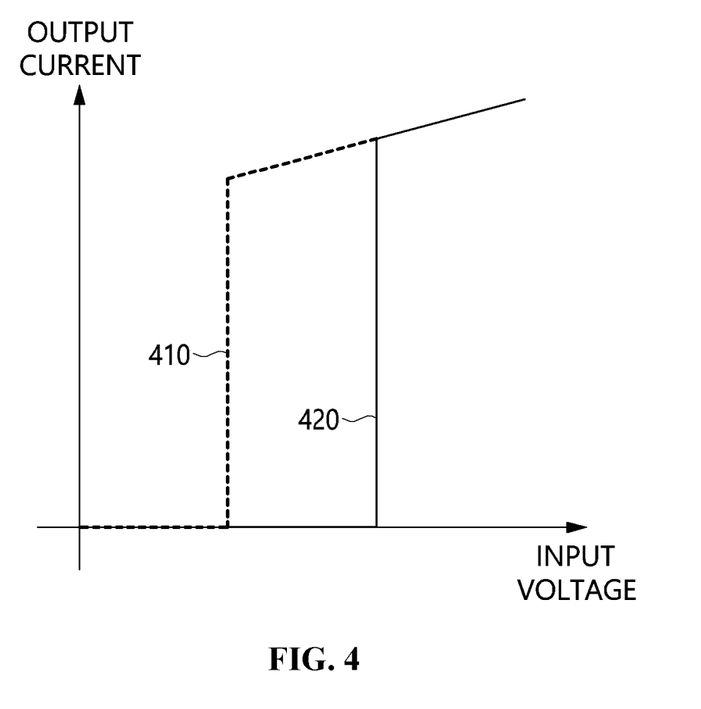
FIG. 4 is a view illustrating an example of an input voltage/output current curve of a flash memory unit device according to the present invention.

For example, referring to FIG. 4, it can be seen that an electrical characteristic is changed depending on whether or not an electron is present in the charge-trapping layer of the flash memory.

Here, FIG. 4 illustrates a graph of output current as a function of input voltage for each of a transistor having a high threshold voltage and a transistor having a low threshold voltage. Here, the input voltage may indicate a gate voltage, and the output current may indicate a drain current.

That is, the dotted line 410 in FIG. 4 illustrates the voltage-current graph of a transistor having a low threshold voltage, and the solid line 420 illustrates the voltage-current graph of a transistor having a high threshold voltage. Here, the dotted line 410 may indicate the case in which the electron density of the charge-trapping layer is low, and the solid line 420 may indicate the case in which the electron density of the charge-trapping layer is high.

Here, the Gaussian error noise may be generated so as to correspond to Gaussian-distributed resistance measured based on the threshold voltage.

Here, the Gaussian-distributed resistance may be measured based on a threshold voltage that is generated while the flash memory repeatedly performs reading, writing, and erasing in compliance with the operation command.

For example, after a request to generate Gaussian error data is received, the flash memory may be controlled so as to perform an erase command. This serves to perform erase and program procedures in the flash memory, and in this process, a read procedure is repeatedly performed, whereby the threshold voltage may be detected.

Here, the Gaussian-distributed resistance may be measured so as to correspond to the physical characteristics of the tunneling phenomenon caused by the threshold voltage in the gate.

Figure 5:
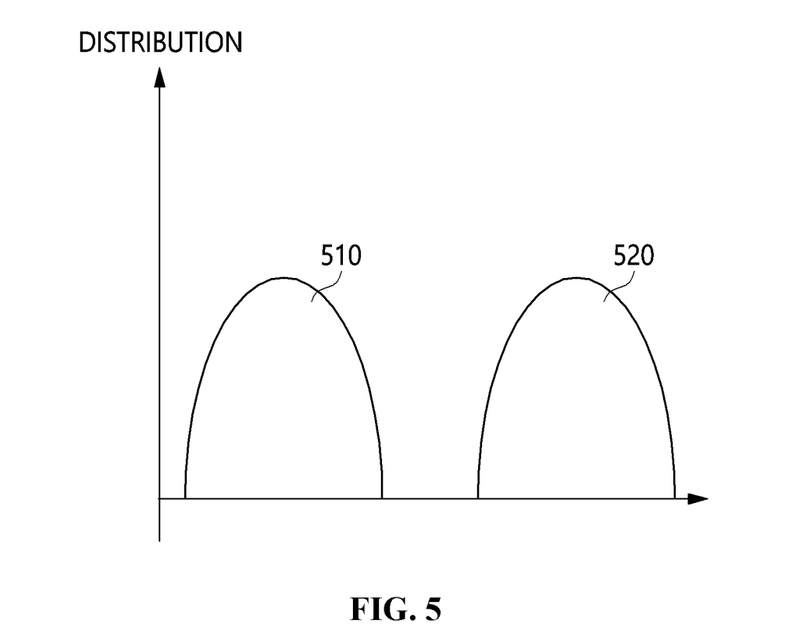
FIG. 5 is a view illustrating an example of a chart showing threshold voltage distribution of flash memory according to the present invention.

For example, FIG. 5 shows a chart of threshold voltage distribution depending on the memory state of the flash memory, and the threshold voltage of the flash memory may unavoidably have a Gaussian distribution due to the physical characteristics of a tunneling phenomenon.

Here, the physical characteristics of a tunneling phenomenon may mean a physical characteristic whereby the position of an electron is described only as a probability, according to Heisenberg's uncertainty principle of quantum mechanics.

For example, as illustrated in FIG. 5, it can be seen that Gaussian-distributed resistance is divided into distribution 510 in a low-electron-density state and distribution 520 in a high-electron-density state. That is, Gaussian-distributed resistance based on the threshold voltage has unpredictable normal distribution, and, using this characteristic, the present invention may generate Gaussian error noise, which is an essential component for implementing lattice-based cryptography of PQC.

Also, in the method for generating Gaussian error data according to an embodiment of the present invention, Gaussian error data is generated so as to correspond to the Gaussian error noise, and is provided at step S230.

Here, the Gaussian error data may be intentional error information for implementing lattice-based cryptography, which is Post-Quantum Cryptography (PQC) technology.

Figure 6:
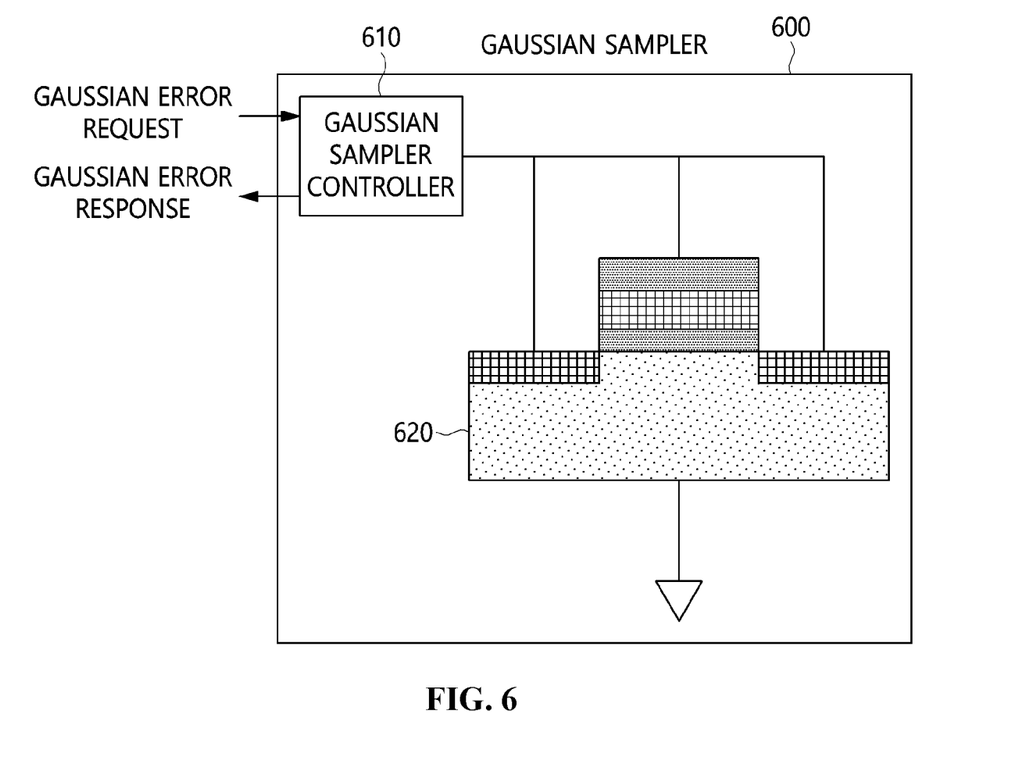
FIG. 6 is a block diagram illustrating an example of a flash memory unit device and a controller according to the present invention.

Here, FIG. 6 illustrates an example of a Gaussian sampler 600 that is implemented by applying the method for generating Gaussian error data according to the present invention, and shows a process in which a Gaussian sampler controller 610 receives a request to generate Gaussian error data (a Gaussian error request) from the outside and outputs Gaussian error data (a Gaussian error response).

Here, the Gaussian sampler controller 610 forming the Gaussian sampler 600 may be the apparatus for generating Gaussian error data proposed by the present invention.

That is, the Gaussian sampler controller 610 may serve to manage a data request and output. That is, the threshold voltage of the unit device of flash memory 620 is extracted, and the threshold voltage may be used to generate an output value of the Gaussian sampler.

Here, the threshold voltage may be detected when the magnitude of current that is output in response to a voltage input to the gate is higher than a specific current.

Through the above-described method for generating Gaussian error data, a Gaussian extractor in which both a high degree of integration and fast read/write characteristics are realized may be implemented using the physical characteristics of a semiconductor unit device without using a true random number generator, an FPGA circuit, or a software circuit.

Also, a Gaussian sampler that has excellent performance although it incurs low production cost may be implemented using flash memory, which is one of the most widely used commercial semiconductor products worldwide.

Also, a Gaussian sampler is implemented using a commercially widely used semiconductor device, whereby overhead from the aspects of implementation size and speed may be reduced compared to when a true random number generator is used or when an FPGA and a software circuit are used.

Figure 7:
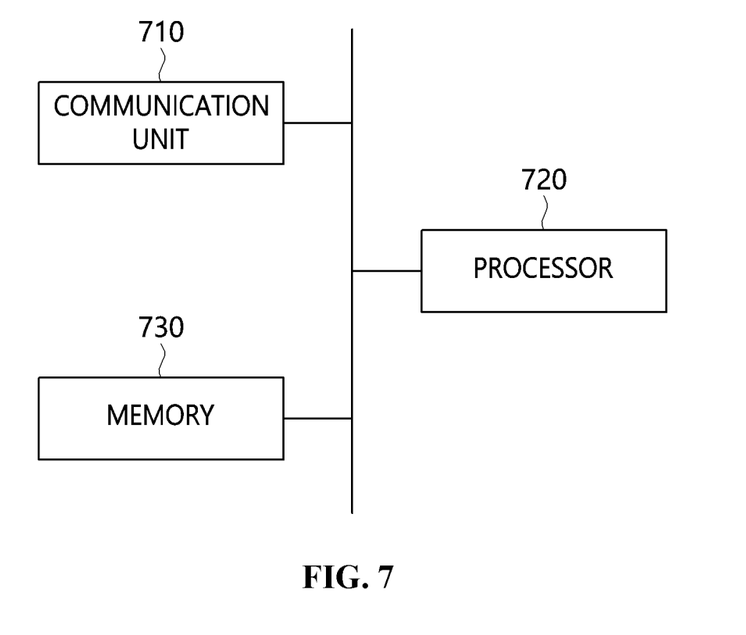
FIG. 7 is a block diagram illustrating an apparatus for generating Gaussian error data according to an embodiment of the present invention.

FIG. 7 is a block diagram illustrating an apparatus for generating Gaussian error data according to an embodiment of the present invention.

Referring to FIG. 7, the apparatus for generating Gaussian error data according to an embodiment of the present invention includes a communication unit 710, a processor 720, and memory 730.

The communication unit 710 may serve to transmit and receive information required for generating Gaussian error data through a communication network. Here, the network provides a path via which data is delivered between devices, and may be conceptually understood to encompass networks that are currently being used and networks that have yet to be developed.

For example, the network may be an IP network, which provides service for transmission and reception of a large amount of data and a seamless data service through an Internet Protocol (IP), an all-IP network, which is an IP network structure that integrates different networks based on IP, or the like, and may be configured as a combination of one or more of a wired network, a Wireless Broadband (WiBro) network, a 3G mobile communication network including WCDMA, a 3.5G mobile communication network including a High-Speed Downlink Packet Access (HSDPA) network and an LTE network, a 4G mobile communication network including LTE advanced, a satellite communication network, and a Wi-Fi network.

Also, the network may be any one of a wired/wireless local area communication network for providing communication between various kinds of data devices in a limited area, a mobile communication network for providing communication between mobile devices or between a mobile device and the outside thereof, a satellite communication network for providing communication between earth stations using a satellite, and a wired/wireless communication network, or may be a combination of two or more selected therefrom. Meanwhile, the transmission protocol standard for the network is not limited to existing transmission protocol standards, but may include all transmission protocol standards to be developed in the future.

The processor 720 receives a request to generate Gaussian error data, and delivers an operation command to flash memory.

Here, the flash memory may include a gate formed of a tunneling oxide, a charge-trapping layer, and a tunneling-blocking oxide.

Also, the processor 720 generates Gaussian error noise based on a threshold voltage that is generated when the flash memory performs the operation command.

Here, the threshold voltage may be a voltage that is generated when a read command is performed in the flash memory unit device.

Here, the higher the electron density of the charge-trapping layer, the higher the threshold voltage.

Here, the Gaussian error noise may be generated so as to correspond to Gaussian-distributed resistance measured based on the threshold voltage.

Here, the Gaussian-distributed resistance may be measured based on a threshold voltage that is generated while the flash memory repeatedly performs reading, writing, and erasing in compliance with the operation command.

Here, the Gaussian-distributed resistance may be measured so as to correspond to the physical characteristics of a tunneling phenomenon caused by the threshold voltage in the gate.

Also, the processor 720 generates Gaussian error data so as to correspond to the Gaussian error noise, and provides the same.

Here, the Gaussian error data may be intentional error information for implementing lattice-based cryptography, which is Post-Quantum Cryptography (PQC) technology.

The memory 730 stores the Gaussian error data.

Also, the memory 730 stores various kinds of information generated in the above-described apparatus for generating Gaussian error data according to an embodiment of the present invention.

According to an embodiment, the memory 730 may be separate from the apparatus for generating Gaussian error data, and may support the function for generating Gaussian error data. Here, the memory 730 may operate as separate mass storage, and may include a control function for performing operations.

Meanwhile, the apparatus for generating Gaussian error data includes memory installed therein, whereby information may be stored therein. In an embodiment, the memory is a computer-readable medium. In an embodiment, the memory may be a volatile memory unit, and in another embodiment, the memory may be a nonvolatile memory unit. In an embodiment, the storage device is a computer-readable recording medium. In different embodiments, the storage device may include, for example, a hard-disk device, an optical disk device, or any other kind of mass storage device.

Using the above-described apparatus for generating Gaussian error data, a Gaussian extractor in which both a high degree of integration and fast read/write characteristics are realized using the physical characteristics of a semiconductor unit device may be implemented without using a true random number generator, an FPGA circuit, or a software circuit.

Also, a Gaussian sampler that has excellent performance although it incurs low production cost may be implemented using flash memory, which is one of the most widely used commercial semiconductor products worldwide.

Also, a Gaussian sampler is implemented using a commercially widely used semiconductor device, whereby overhead from the aspects of implementation size and speed may be reduced compared to when a true random number generator is used or when an FPGA and a software circuit are used.

Figure 8:
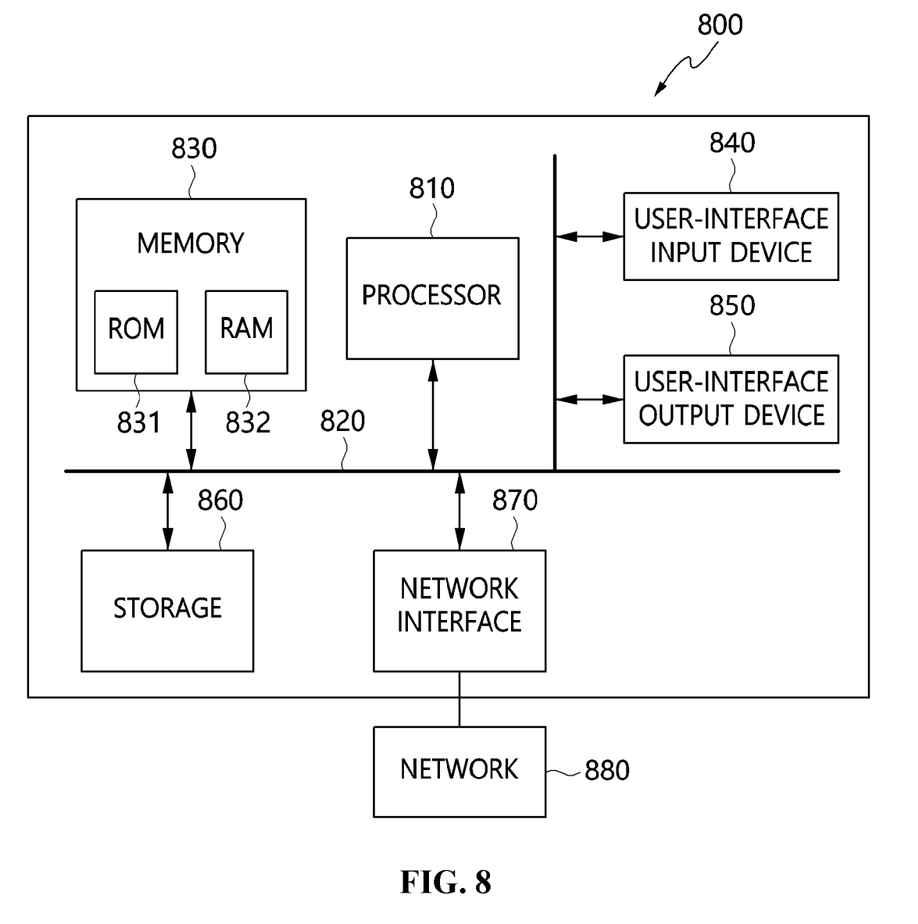
FIG. 8 is a view illustrating a computer system according to an embodiment of the present invention.

FIG. 8 is a view illustrating a computer system according to an embodiment of the present invention.

Referring to FIG. 8, an embodiment of the present invention may be implemented in a computer system including a computer-readable recording medium. As illustrated in FIG. 8, the computer system 800 may include one or more processors 810, memory 830, a user-interface input device 840, a user-interface output device 850, and storage 860, which communicate with each other via a bus 820. Also, the computer system 800 may further include a network interface 870 connected to a network 880. The processor 810 may be a central processing unit or a semiconductor device for executing processing instructions stored in the memory 830 or the storage 860. The memory 830 and the storage 860 may be any of various types of volatile or nonvolatile storage media. For example, the memory may include ROM 831 or RAM 832.

Accordingly, an embodiment of the present invention may be implemented as a non-transitory computer-readable storage medium in which methods implemented using a computer or instructions executable in a computer are recorded. When the computer-readable instructions are executed by a processor, the computer-readable instructions may perform a method according to at least one aspect of the present invention.

According to the present invention, a Gaussian extractor in which both a high degree of integration and fast read/write characteristics are realized using the physical characteristics of a semiconductor unit device may be implemented without a true random number generator.

Also, the present invention may provide a Gaussian sampler that has excellent performance although it incurs low production cost by using flash memory, which is one of the most widely used commercial semiconductor products worldwide.

Also, the present invention implements a Gaussian sampler using a commercially widely used semiconductor device, thereby reducing overhead from the aspects of implementation size and speed compared to when a true random number generator is used or when an FPGA and a software circuit are used.

As described above, the method for generating Gaussian error data using flash memory and the apparatus using the method according to the present invention are not limitedly applied to the configurations and operations of the above-described embodiments, but all or some of the embodiments may be selectively combined and configured, so that the embodiments may be modified in various ways.

What is claimed is:

1. A method for generating Gaussian error data, comprising:
   receiving a request to generate Gaussian error data and delivering an operation command to flash memory;
   generating Gaussian error noise based on a threshold voltage that is generated when the flash memory performs the operation command; and
   generating Gaussian error data so as to correspond to the Gaussian error noise and providing the Gaussian error data.

2. The method of claim 1, wherein the Gaussian error noise is generated so as to correspond to a Gaussian-distributed resistance measured based on the threshold voltage.

3. The method of claim 1, wherein the threshold voltage is a voltage that is generated when a flash memory unit device performs a read command.

4. The method of claim 3, wherein the Gaussian-distributed resistance is measured based on the threshold voltage that is generated while the flash memory repeatedly performs reading, writing, and erasing in compliance with the operation command.

5. The method of claim 1, wherein the Gaussian error data is intentional error information for implementing lattice-based cryptography, which is Post-Quantum Cryptography (PQC) technology.

6. The method of claim 2, wherein the flash memory includes a gate formed of a tunneling oxide, a charge-trapping layer, and a tunneling-blocking oxide.

7. The method of claim 6, wherein the Gaussian-distributed resistance is measured so as to correspond to physical characteristics of a tunneling phenomenon caused by the threshold voltage in the gate.

8. The method of claim 6, wherein the threshold voltage is raised as an electron density of the charge-trapping layer is higher.

9. An apparatus for generating Gaussian error data, comprising:
   a processor for receiving a request to generate Gaussian error data, delivering an operation command to flash memory, generating Gaussian error noise based on a threshold voltage that is generated when the flash memory performs the operation command, generating Gaussian error data so as to correspond to the Gaussian error noise, and providing the Gaussian error data; and
   memory for storing the Gaussian error data.

10. The apparatus of claim 9, wherein the Gaussian error noise is generated so as to correspond to a Gaussian-distributed resistance measured based on the threshold voltage.

11. The apparatus of claim 9, wherein the threshold voltage is a voltage that is generated when a flash memory unit device performs a read command.

12. The apparatus of claim 11, wherein the Gaussian-distributed resistance is measured based on the threshold voltage that is generated while the flash memory repeatedly performs reading, writing, and erasing in compliance with the operation command.

13. The apparatus of claim 9, wherein the Gaussian error data is intentional error information for implementing lattice-based cryptography, which is Post-Quantum Cryptography (PQC) technology.

14. The apparatus of claim 10, wherein the flash memory includes a gate formed of a tunneling oxide, a charge-trapping layer, and a tunneling-blocking oxide.

15. The apparatus of claim 14, wherein the Gaussian-distributed resistance is measured so as to correspond to physical characteristics of a tunneling phenomenon caused by the threshold voltage in the gate.

16. The apparatus of claim 14, wherein the threshold voltage is raised as an electron density of the charge-trapping layer is higher.

* * * * *